United States Patent
Ishii

(10) Patent No.: US 11,941,853 B2
(45) Date of Patent: Mar. 26, 2024

(54) APPARATUS AND METHOD

(71) Applicant: CANON KABUSHIKI KAISHA, Tokyo (JP)

(72) Inventor: Toshiyuki Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 17/506,189

(22) Filed: Oct. 20, 2021

(65) Prior Publication Data

US 2022/0148228 A1 May 12, 2022

(30) Foreign Application Priority Data

Nov. 9, 2020 (JP) ................................ 2020-186562

(51) Int. Cl.
*G06T 7/90* (2017.01)
*G06T 1/00* (2006.01)

(52) U.S. Cl.
CPC .............. *G06T 7/90* (2017.01); *G06T 1/0007* (2013.01); *G06T 2207/20081* (2013.01)

(58) Field of Classification Search
CPC ..................... G06T 7/90; G06T 1/0007; G06T 2207/20081; G06T 1/20
See application file for complete search history.

(56) References Cited

U.S. PATENT DOCUMENTS

2021/0021757 A1* 1/2021 Nakao ........................ G06T 5/50
2021/0374480 A1* 12/2021 Nakao .................... H04N 23/60

FOREIGN PATENT DOCUMENTS

JP  2016162421 A  9/2016

* cited by examiner

*Primary Examiner* — Phuoc Tran
(74) *Attorney, Agent, or Firm* — CANON U.S.A., INC. IP Division

(57) ABSTRACT

An apparatus acquires RAW image data captured by a first device and captured image data captured by a second device, obtains a parameter of the first device by using a learning model that has learned a correspondence relationship between a parameter used to develop RAW image data and an image developed using the parameter such that the characteristics of a developed image of the RAW image data are close to the characteristics of the captured image, and develops the RAW image data.

18 Claims, 12 Drawing Sheets

APPARATUS AND METHOD

BACKGROUND OF THE DISCLOSURE

Field of the Disclosure

The aspect of the embodiments relates to an image processing technology for developing a captured image.

Description of the Related Art

The RAW data obtained from an image sensor of a digital camera or a digital cinema camera at the time of image capturing holds the value obtained by A/D converting the output value of the image sensor without any modification. By performing a development process on the RAW data, image data representing the captured image (hereinafter also referred to as a "developed image") is generated. The development process includes one or a plurality of image processes, such as a demosaicking process for converting pixel data of a Bayer array into pixel values of three RGB channels, an exposure compensation process, a white balance correction process, and a noise removal process. The parameters used for the development process are also called development parameters. If a person who captures the image retains the RAW data, they can generate a desired developed image by adjusting the development parameters after capturing the image. Japanese Patent Laid-Open No. 2016-162421 describes that the development parameters used to develop RAW data are acquired on the basis of the aesthetics indicating the preference of the image.

Even if the person wants to match the colors between images captured by cameras of different models and attempts to apply the same development parameter, it may be difficult to apply the parameter, because items of the development parameter differ not only from camera maker to camera maker and but also from camera model to camera model from the same camera maker due to the difference in sensor output value or development process.

In this case, the person is to manually adjust the value of development parameters within the adjustable range so as to obtain a desired image while referring to the images captured by the cameras having colors to be matched, which requires a lot of work and time. Alternatively, some cameras have a color conversion function based on 3DLUT to match colors. However, to create 3DLUT, a dedicated measuring instrument and specialized knowledge for creation are required.

SUMMARY OF THE DISCLOSURE

According to an aspect of the embodiments, an apparatus comprises a first acquisition unit configured to acquire RAW image data captured by a first device and captured image data captured by a second device, and a development unit configured to obtain a parameter of the first device by using a learning model that has learned a correspondence relationship between a parameter used to develop RAW image data and an image developed using the parameter such that characteristics of a developed image of the RAW image data are close to characteristics of the captured image and develop the RAW image data.

Further features of the disclosure will become apparent from the following description of exemplary embodiments with reference to the attached drawings.

DESCRIPTION OF THE EMBODIMENTS

Exemplary embodiments are described below with reference to the accompanying drawings. The embodiments described below do not necessarily limit the disclosure. In addition, not all combinations of the features described in the embodiment are essential for solving the issue of the disclosure.

First Embodiment

Hardware Configuration of Image Processing Apparatus

Figure 1:
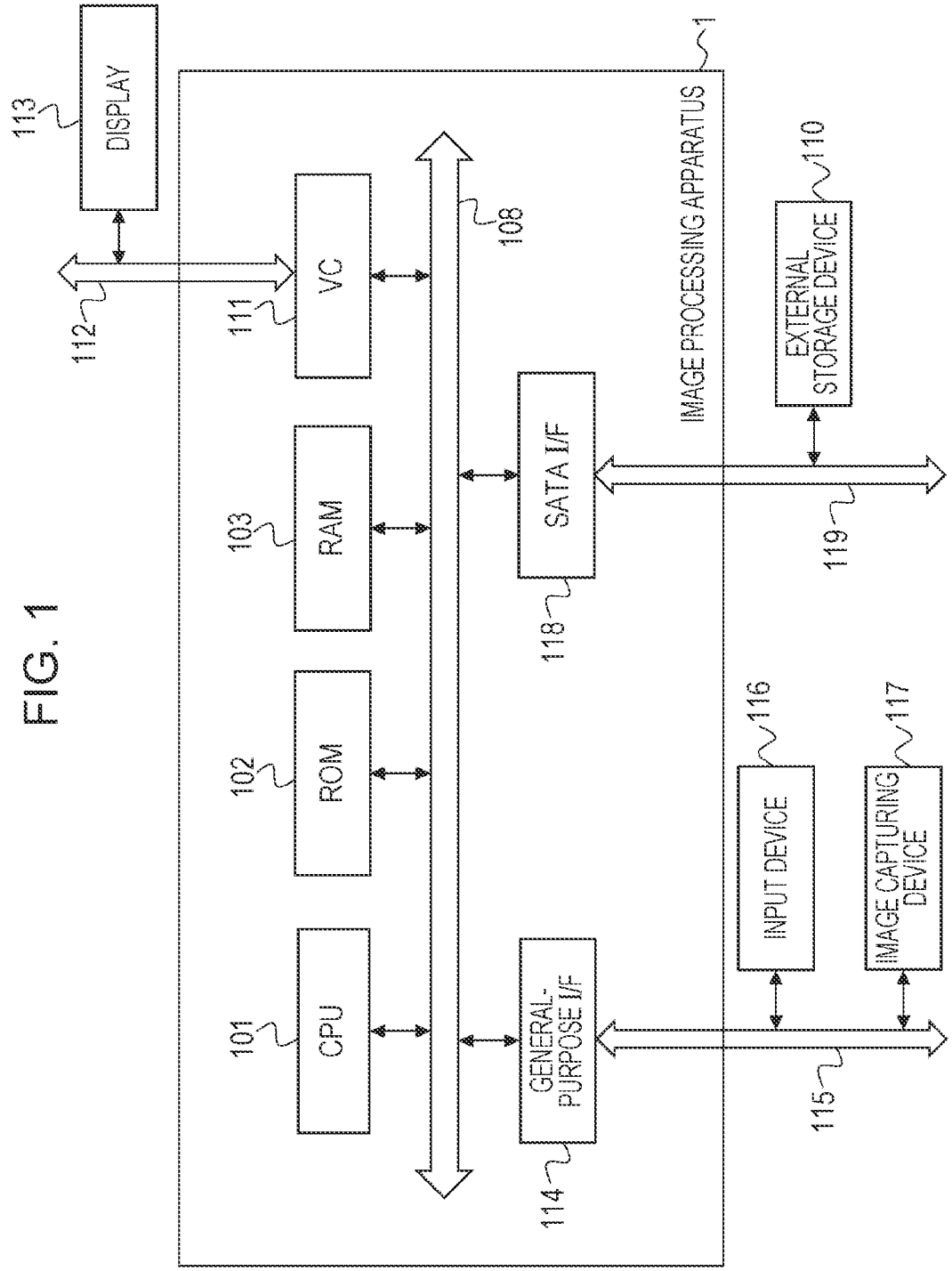
FIG. 1 illustrates an example of the hardware configuration of an image processing apparatus.

FIG. 1 illustrates an example of the hardware configuration of an image processing apparatus 1. The image processing apparatus 1 includes a CPU 101, a ROM 102, a RAM 103, a VC (video card) 111, a general-purpose I/F 114, and a SATA (Serial ATA) I/F 118. The CPU 101 uses the RAM 103 as a work memory and executes an operating system (OS) and a variety of programs stored in the ROM 102, the external storage device 110, and the like. In addition, the CPU 101 controls each of the configurations via a system bus 108. An input device 116, such as a mouse or a keyboard, and an image capturing device 117 are connected to the general-purpose I/F 114 via a serial bus 115. An external storage device 110 is connected to the SATA I/F 118 via a serial bus 119. A display 113 is connected to the VC 111 via a serial bus 112. The CPU 101 displays a user interface (UI) provided by the program on the display 113 and receives input information representing a user instruction obtained via the input device 116. For example, a desktop PC serves as the image processing apparatus 1 illustrated in FIG. 1.

Note that the external storage device 110 is an HDD. However, according to the present embodiment, the external storage device 110 is not limited thereto. For example, the external storage device 110 may be a solid state drive (SSD). Alternatively, the external storage device 110 can be achieved by a medium (a storage medium) and an external storage drive for accessing the medium. As the medium, a flexible disk (FD), a CD-ROM, a DVD, a USB memory, an MO, a flash memory, or the like can be used.

Configuration of Image Processing Apparatus

Figure 2:
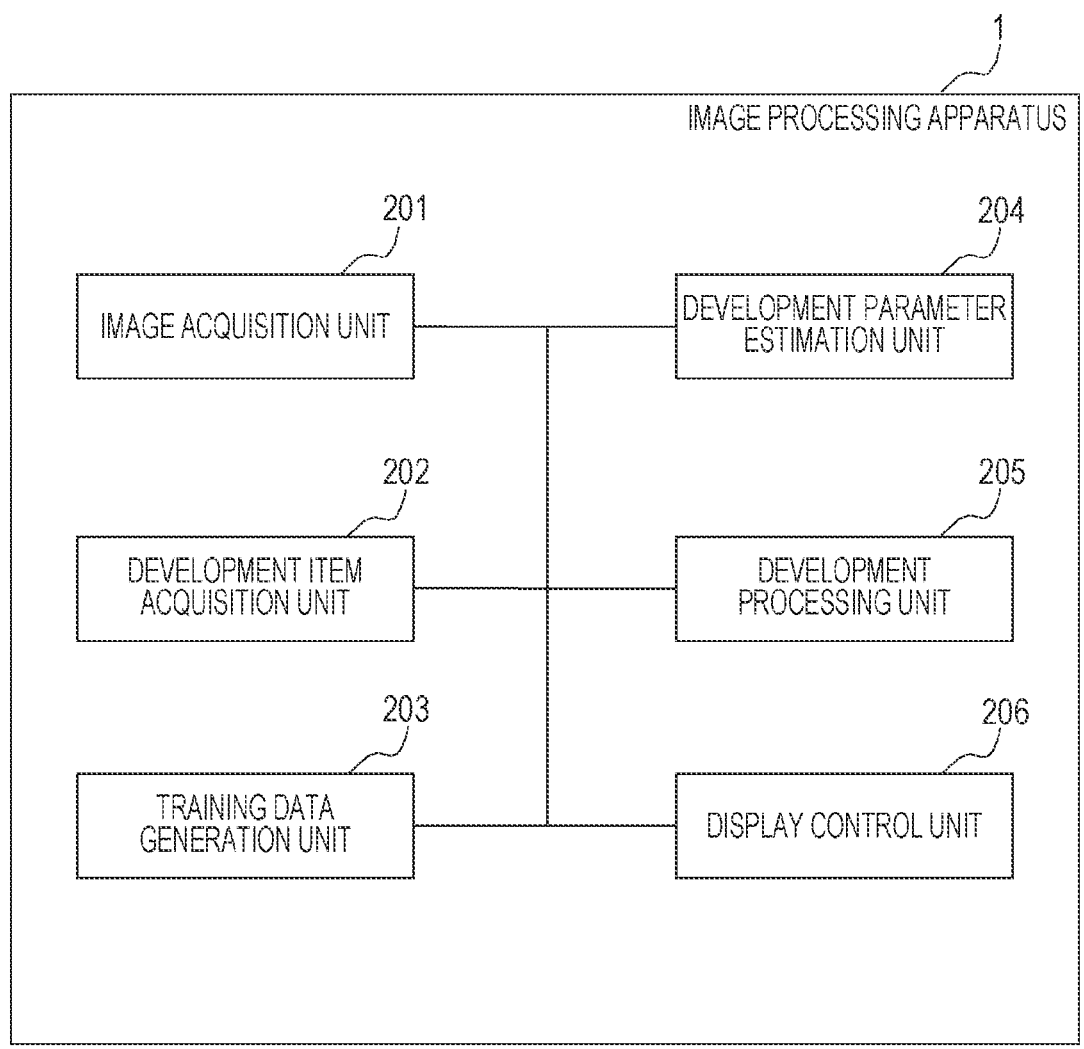
FIG. 2 is a block diagram of the logical configuration of the image processing apparatus.

FIG. 2 is a block diagram of the configuration of the image processing apparatus 1. The image processing apparatus 1 functions as the configuration illustrated in FIG. 2 by the CPU 101 that uses the RAM 103 as a work memory and executes the program stored in the ROM 102. It should be noted that all of the processes described below do not necessarily have to be executed by the CPU 101, and the image processing apparatus 1 may be configured such that a subset or all of the processes are performed by one or a plurality of processing circuits other than the CPU 101.

The image processing apparatus 1 includes an image acquisition unit 201, a development item acquisition unit 202, a training data generation unit 203, a development parameter estimation unit 204, a development process unit 205, and a display control unit 206. The image acquisition unit 201 acquires a target image to be color-matched and image data, such as RAW data to be corrected, and RAW data to be used for training, from the image capturing device 117, the ROM 102, the external storage device 110, and the like. Hereinafter, the RAW data is also referred to as "image data". The development item acquisition unit 202 acquires processing items, such as white balance and gamma curve, which are processed for RAW data in the development process. Hereinafter, the acquired processing item is also referred to as a "development item" or an "item". The training data generation unit 203 generates training image data used to generate a learning model for the item acquired by the development item acquisition unit 202. The development parameter estimation unit 204 generates the learning model on the basis of the data generated by the training data generation unit 203 and estimates development parameters on the basis of the learning model. The development process unit 205 performs a development process on the correction source RAW data acquired by the image acquisition unit 201 on the basis of the development parameters estimated by the development parameter estimation unit 204. The display control unit 206 controls the user interface used to prompt a user to input information for processing and controls displaying of the processed image.

Processing Performed by Image Processing Apparatus

Figure 3:
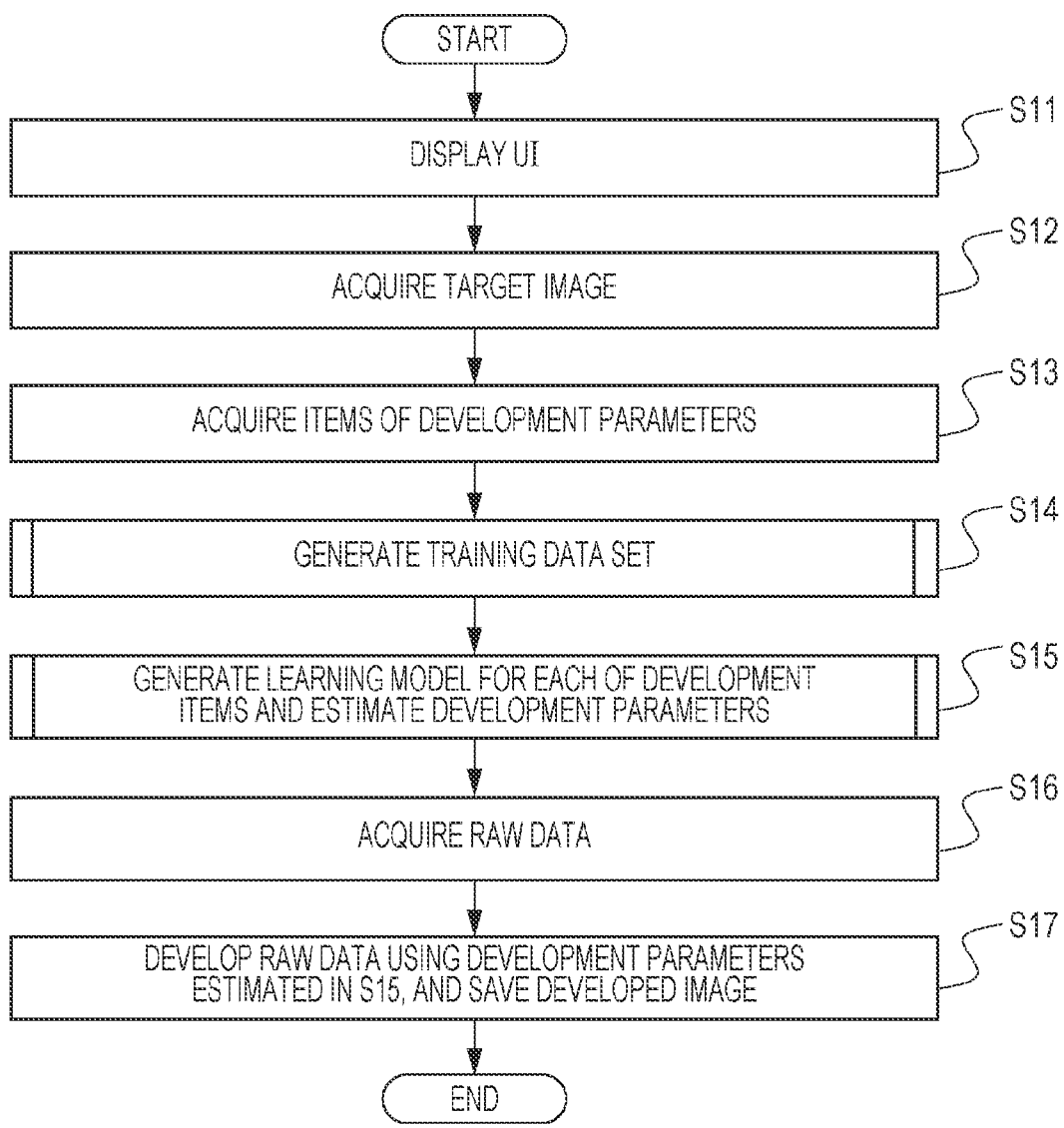
FIG. 3 is a flowchart of the processing performed by the image processing apparatus.

FIG. 3 is a flowchart of the processing performed by the image processing apparatus 1. Hereinafter, each step (process) is identified by the letter S followed by a number.

Figure 4:
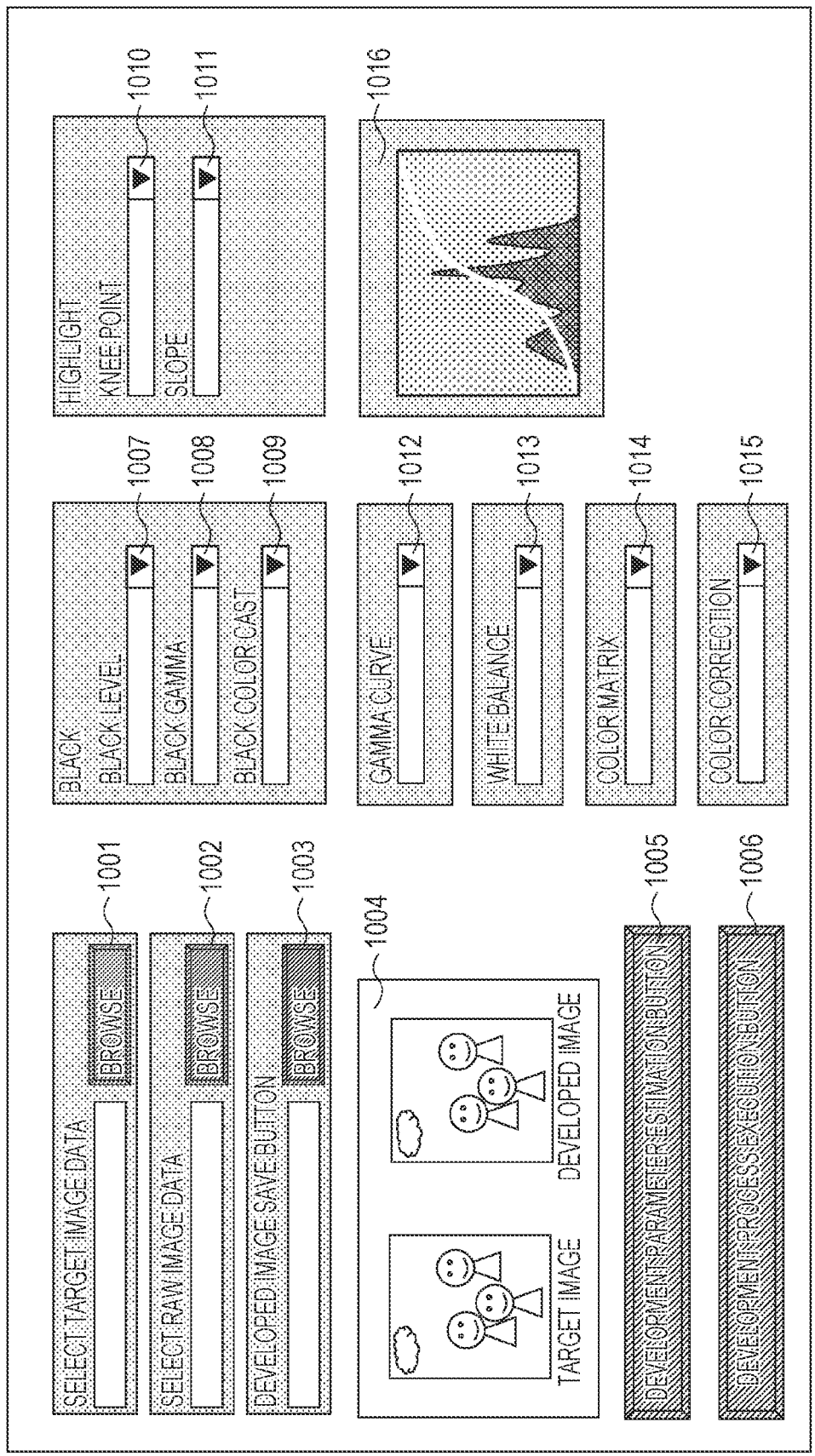
FIG. 4 illustrates an example of a graphical user interface.

In S11, the display control unit 206 instructs the display 113 to display a graphical user interface (hereinafter, GUI) for prompting the user to input information for the processing. In addition, the display control unit 206 receives an instruction from the user via the GUI. FIG. 4 illustrates an example of the GUI. The display control unit 206 first displays, on the display 113, a GUI for performing the development process.

In FIG. 4, a target image data selection button 1001 is a button for the user to select and input a target image to be color-matched. A RAW image data selection button 1002 is a button for the user to select and input RAW image data. A developed image save button 1003 is a button for the user to select and input the save location of the developed image. An image display area 1004 is an area in which images are to be displayed. The image data selected by the target image data selection button 1001 is displayed on the left side, and the developed image data subjected to the development process is displayed on the right side.

When a development parameter estimation button 1005 is pressed, a process of estimating the development parameters is performed, and the estimated parameters are set in each of development parameter setting sections 1007 to 1015 (described below). When a development process execution button 1006 is pressed, the development process is performed on the image selected by the RAW image data selection button 1002 on the basis of the set development parameters.

The development parameter setting section 1007 sets a development parameter that influences the brightness level of a dark part of the image. The black gamma setting section 1008 sets a development parameter that influences the tone curve of the dark part of the image. A black color cast setting section 1009 sets a development parameter that influences the tint of the dark part of the image. A knee point setting section 1010 sets a development parameter that influences the compression start point in compression of the high-brightness part. The slope setting section 1011 sets a development parameter that influences the slope of the compression curve in compression of the high-brightness part. A gamma curve setting section 1012 sets development parameters that influence the gradation of brightness of the entire image. A white balance setting section 1013 sets a development parameter that influences the overall tint of an image. A color matrix setting section 1014 sets a development parameter that influences the overall tint of an image. A color correction setting section 1015 sets a development parameter that influences the tint of a specific hue.

A gamma curve display area 1016 displays a brightness histogram of the pixel values of the developed image and a set gamma curve.

In S12, the image acquisition unit 201 acquires, as an input image, image data (hereinafter also referred to as target image data) indicating a target image to be color-matched. More specifically, when the image acquisition unit 201 receives, from the display control unit 206, the information for identifying the image designated as the target image by the user instruction, the image acquisition unit 201 identifies the location at which the target image data is stored and reads the target image data from the ROM 102. The target image data has already been developed through a predetermined development process, and the target image data consists of image data of each of the colors R (red), G (green), and B (blue). Note that steps S11 and S12 may be performed in reversed order.

In S13, the development item acquisition unit 202 acquires the items of development parameter (hereinafter also referred to as "development items") used in the development process. For example, among the items in the GUI illustrated in FIG. 4, the item in which an instruction is input from the user is acquired. Note that the item is not limited to the item input from the user, and at least one predetermined item may be used. The items of development parameter to be acquired are described below.

In S14, the training data generation unit 203 generates a training data set for generating a learning model for each of the development items. The processing performed by the training data generation unit 203 is described in detail below.

In S15, the development parameter estimation unit 204 generates a learning model for each of the development items acquired in S13 and estimates the development parameters. The processing performed by the development parameter estimation unit 204 is described in detail below.

In S16, the image acquisition unit 201 acquires RAW data to be corrected so that the image characteristics of the RAW data is to be matched with those of the target image.

In S17, the image processing apparatus 1 performs the development process on the RAW data by using the developing parameters estimated in S15, stores the image data subjected to the development process, and ends the development process.

Operation Performed by Training Data Generation Unit

Figure 5:
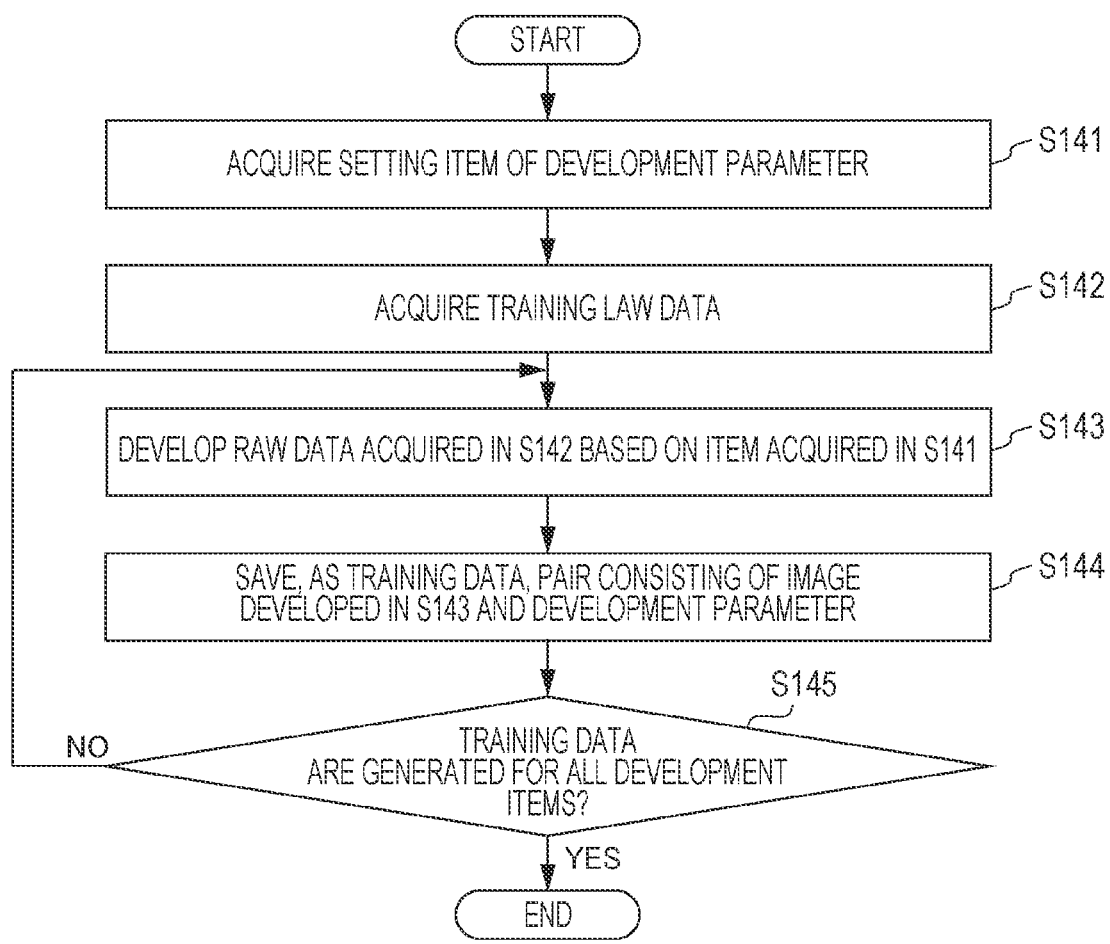
FIG. 5 is a flowchart of the processing performed by a training data generation unit.

FIG. 5 is a flowchart of the processing performed by the training data generation unit 203 in S14.

In S141, the training data generation unit 203 acquires the development items of development parameter acquired in S13. According to the present embodiment, the development items that affect the image characteristics include the following nine items: "black level", "black gamma", "black color cast", "knee point", "slope", "gamma curve", "white balance", "color matrix" and "color correction". However, the disclosure is not limited to these items, and other items may be used. Alternatively, only a subset of these items may be used. The developing process for each of the items is described below.

Figure 6:
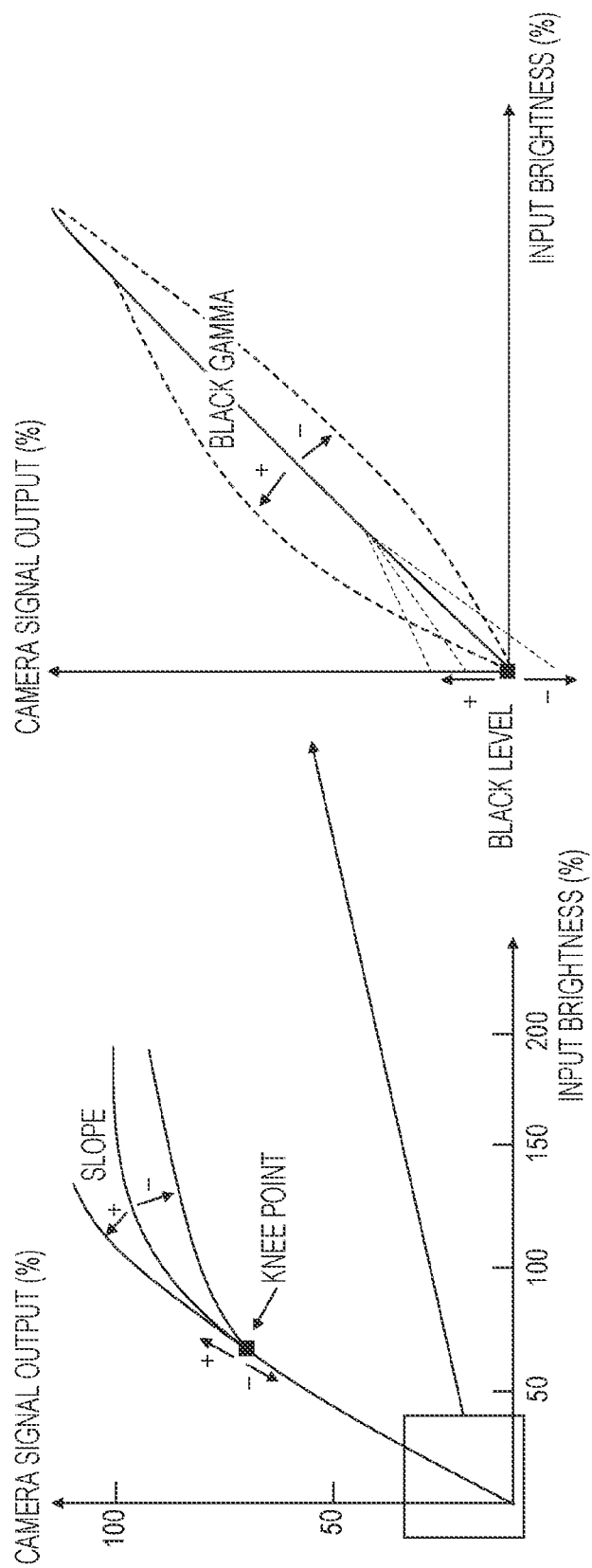
FIG. 6 is a diagram illustrating an example of development parameters.

The items "knee point" and "slope" are the point used to compress the camera signal in order to avoid blown out highlights so that the input signal value of a high-brightness part of a subject falls within the dynamic range of the camera as illustrated in FIG. 6 and the slope at the point, respectively. If the "slope" is set to the minus side, the slope becomes gentle, and the expressible dynamic range is increased, while the expressive power of gradation is decreased. In contrast, if the "slope" is set to the plus side, the slope becomes steeper, and the expressible dynamic range is decreased, while the expressive power of gradation is increased.

The items "black level" and "black gamma" are parameters that adjust the expressive power of black. As illustrated in FIG. 6, when the adjustment value is set to the plus side, the blacks are lifted. In contrast, when the adjustment value is set to the minus side, the blacks are crushed, and the image has a higher contrast. The item "black gamma" sets the range and level of brightness in which black gamma is effective. When the level is set to the plus side, the image becomes brighter. In contrast, when the level is set to the minus side, the image becomes darker.

The item "black color cast" provides, as an adjustment item, the gain amount for each of the signal values R, G, and B to adjust the gain ratios of R, G, and B when the black is tinted. Thus, the color cast in the dark part of the image is reduced.

The item "gamma curve" is a parameter that sets the gradation characteristic between the input signal value and a camera output signal value and sets the overall brightness of the image.

The item "white balance" is a parameter for adjusting the gain ratios of R, G, and B of the image so as to set the overall tint of the image.

The item "color matrix" is used for color conversion using a conversion matrix. A plurality of conversion matrices are stored for converting specific colors of an image into target colors (e.g., sRGB and Adobe RGB). The item "color correction" is a parameter that adjusts the tint of a specific hue. The hue angles are divided into the following six sections: R/G, R/B, G/R, G/B, B/R, and B/G in accordance with the hue circle, and the values of brightness, saturation, and hue are adjusted.

The development items described in the present embodiment are merely examples, and the items may be changed in accordance with the development items that are open to the public by the development process application of the camera to be used.

In S142, the training data generation unit 203 acquires a RAW image data group prepared as training image data to be used for learning model generation. According to the present embodiment, RAW data of 1000 images of various categories, such as portrait images, landscape images, sport images, hobbies images, and food images are prepared and stored in advance. However, images of a specific category may be retained in accordance with the user's preference. In addition, the number of images to be prepared is not limited thereto.

In S143, the training data generation unit 203 develops the RAW data acquired in S142 on the basis of the item acquired in S141. An example of the development setting is described below. However, the ranges of set values, the step size, and the numerical values are not limited thereto, and may be freely set within the range that is open to the public by the development process application of the camera to be used.

First, to compress a high-brightness part, 125 settings are used in which the "knee point" is selected from the range of 75% to 100% of the input signal value in increments of 5% and the "slope" is changed in 5 steps for each of the plus and minus sides, and the development process is performed for each setting. Thus, 125 developed images having different reproductions of the high-brightness part are generated. For black, the "black level" is set up to ±10 in increments of 2 RGB counts (10 steps). For "black gamma", curves of different gamma intensities are set in each of three brightness ranges $L^*=0$ to 10, 0 to 15, and 0 to 20 in 3 steps for each of the plus and minus sides. In addition, for "black color cast", 7 sets of coefficients having different RGB ratios are set. For black, the development process is performed in each of 1470 settings (1470 combinations of the following three: "black level", "black gamma", and "black color cast") that provide different reproductions of black color. For "gamma curve", 10 curves of different brightness gradation characteristics are set, and the development process is performed to generate 10 developed images having different gradation characteristics. For "white balance", 50 sets of coefficients of different RGB ratios are set, and the development process is performed to generate 50 developed images having different white chromaticity values. For "color matrix", 10 types of 3×3 determinants of coefficients calculated in advance so as to obtain a desired target value are prepared, and the development process is performed using each of the determinants to generate 10 developed images having different color reproductions. For "color correction", the brightness is changed in ±2 steps, the saturation is changed in ±2 steps, and the Hue is changed in ±2 steps for each of 6 hue angles to generate 750 settings, and the development process is performed using each of the settings to generate 750 developed images having different color reproductions for each of specific hues.

In S144, the training data generation unit 203 saves, as training data, a pair consisting of a developed image subjected to the development process in S143 and the development parameters used in the development process.

Figure 7:
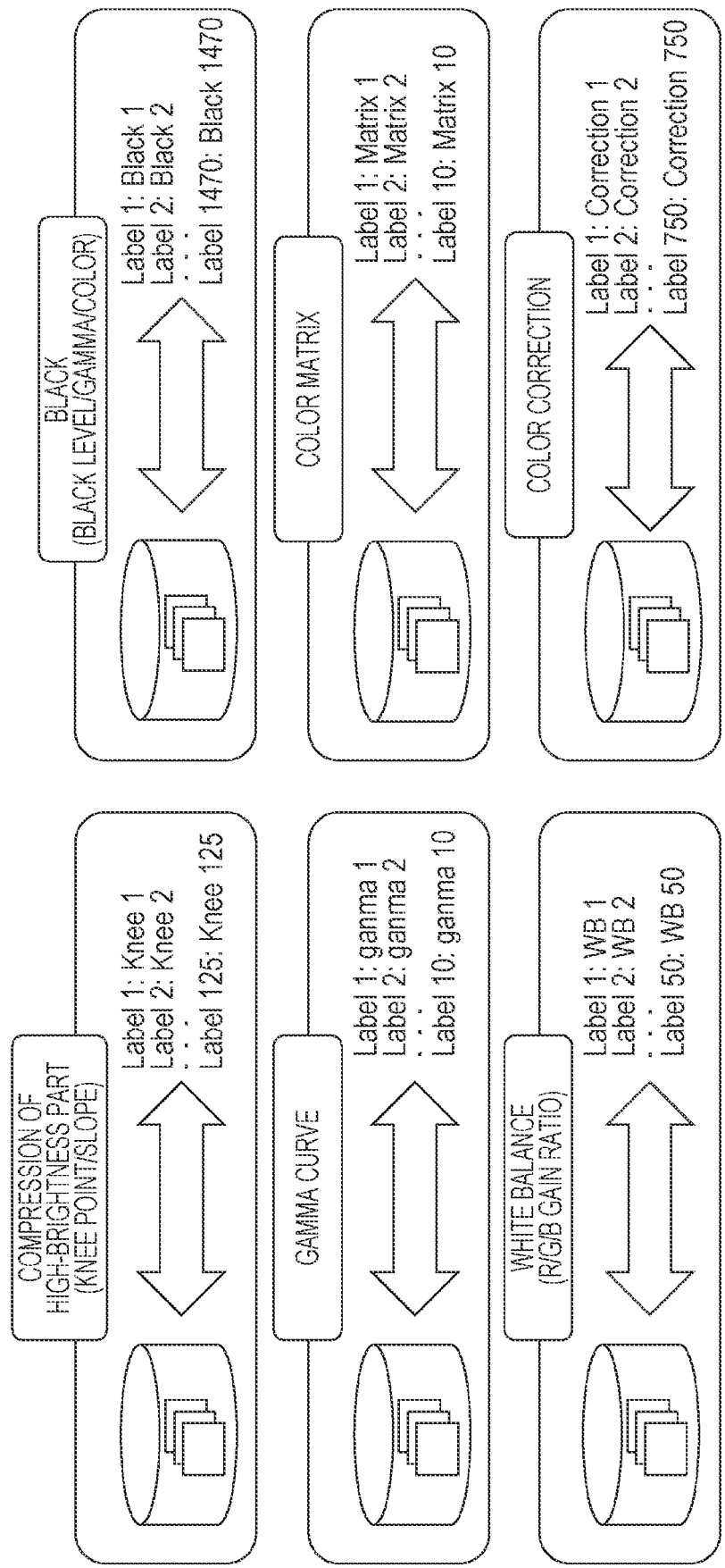
FIG. 7 illustrates an example of a training data set.

FIG. 7 is a schematic illustration of the training data. According to the present embodiment, the correspondence relationship between a development parameter and a developed image developed using the development parameter is labeled on a one-to-one basis. The labeling is performed on the RAW data of 1000 images for each of the development items.

In S145, the training data generation unit 203 determines whether the training data has been generated for all the development items. If the training data has not been generated for all the development items, the processing returns to S143. However, if the training data has been generated for all the development items, the processing ends.

Operation Performed by Development Parameter Estimation Unit

Figure 8:
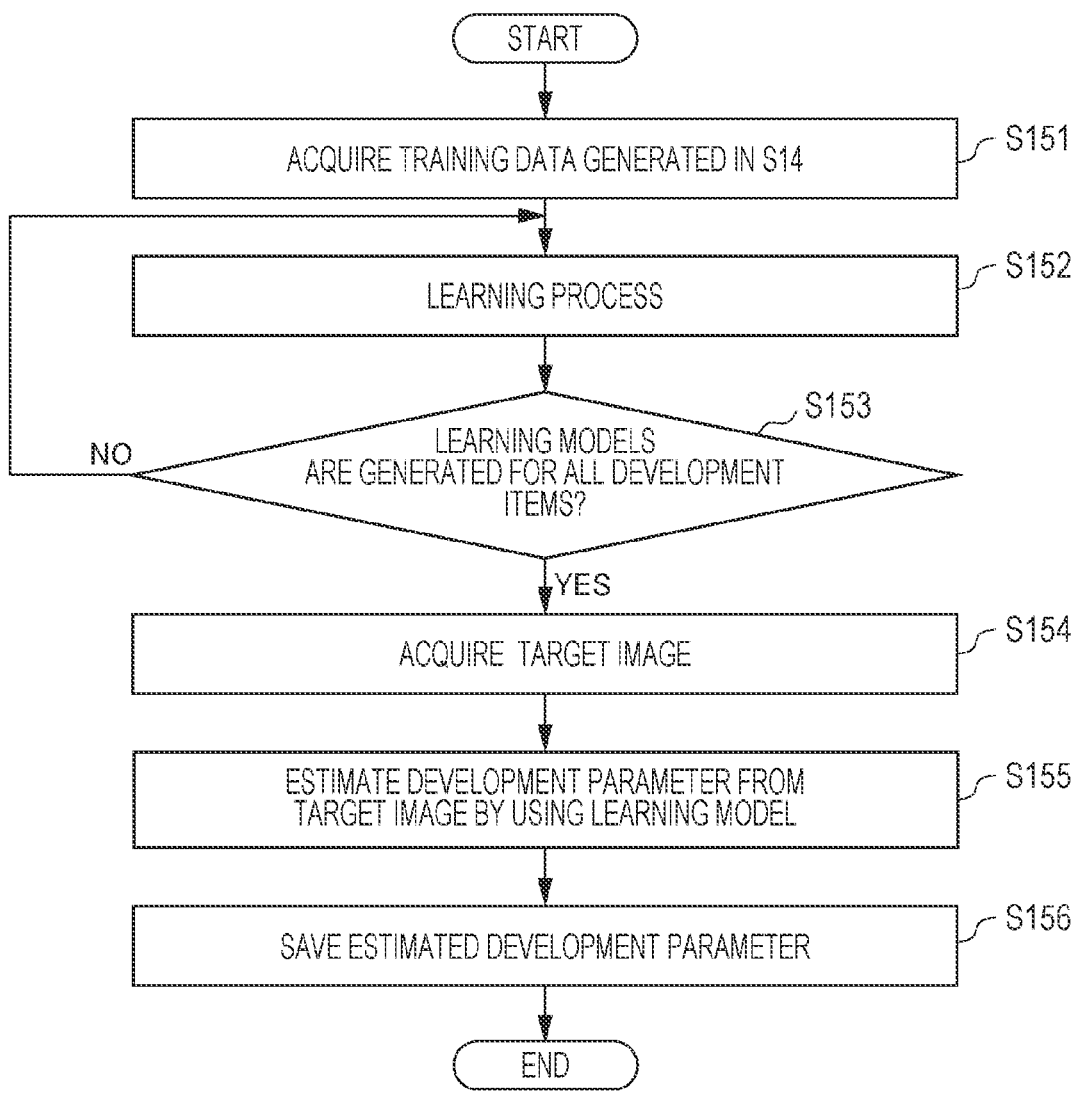
FIG. 8 is a flowchart of the processing performed by a development parameter estimation unit.

FIG. 8 is a flowchart of the processing performed by the development parameter estimation unit 204 in S15.

In S151, the development parameter estimation unit 204 acquires the training data set generated in S14 to generate a learning model.

Figure 9:
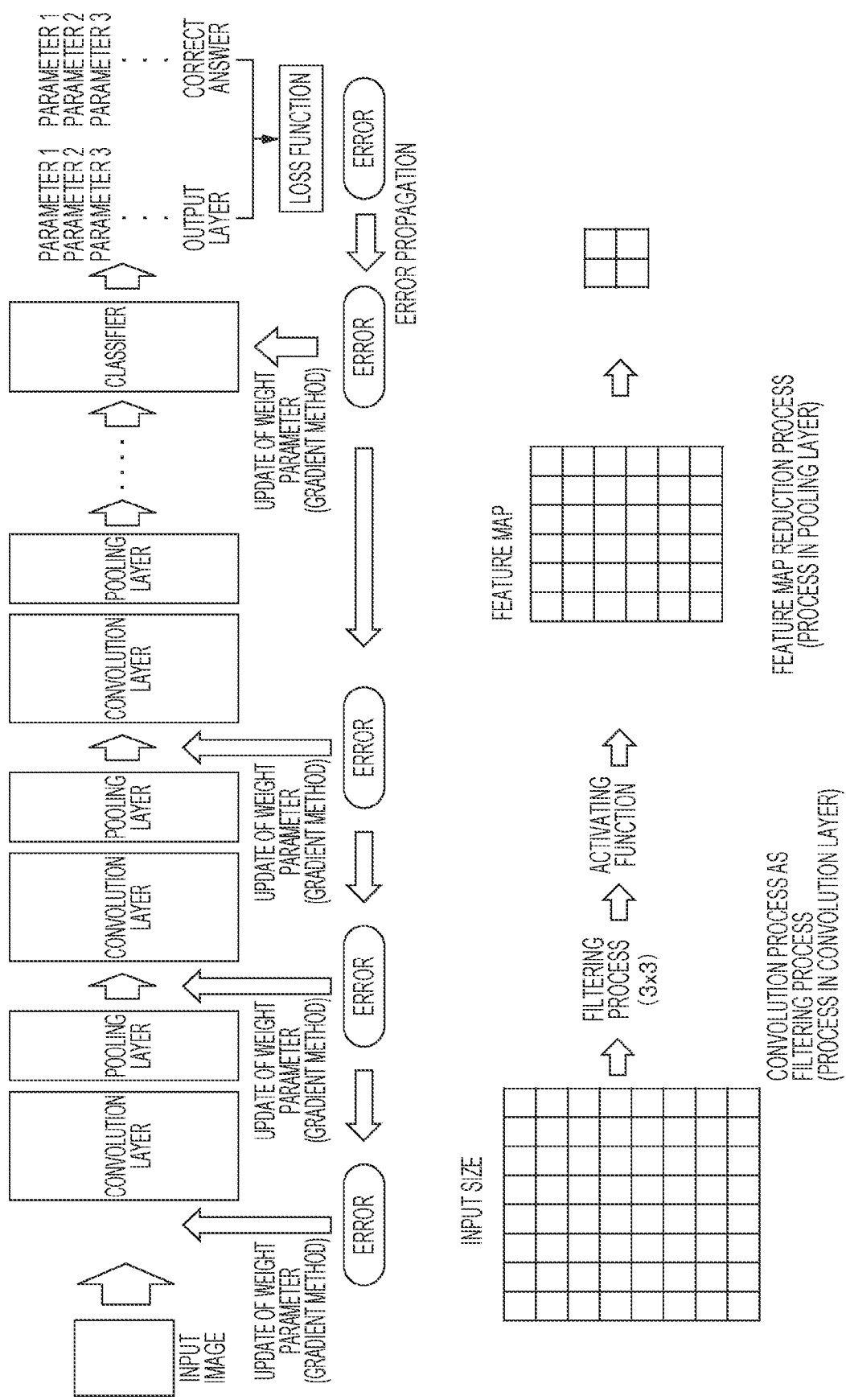
FIG. 9 illustrates a learning process performed by the development parameter estimation unit.

In S152, the development parameter estimation unit 204 performs a learning process. Note that according to the present embodiment, the learning process uses a convolutional neural network (CNN), and the overview of the process is illustrated in FIG. 9. As the configuration of the convolution layer and the pooling layer used in the process, VGG 16 that contains 16 layers is used. In the convolution layer, the input image is filtered (3×3), and non-linear processing using the activation function is performed. In the pooling layer, a feature map processed in the convolution layer is reduced. According to the present embodiment, the sigmoid function is used as the activation function. However, other non-linear processing, such as the ReLU function, may be used. A classifier classifies the development parameters into categories on the basis of the feature maps processed in the convolutional layer and the pooling layer. The loss function uses cross entropy to compare a forecast category of the classifier with the real category and optimizes the weight parameter that minimizes the loss function by using a gradient method. The developed image generated in S14 is set as the input image, and the labeled development parameter is set as the correct answer data. Thereafter, a learning model for classifying the developed parameters of the input image is generated on the basis of the set image data and label.

In S153, the development parameter estimation unit 204 determines whether a learning model has been generated for all the development items. If the learning model has not been generated for all the development items, the processing returns to S152. However, if the learning model has been generated for all the development items, the processing proceeds to S154.

In S154, the development parameter estimation unit 204 acquires a target image to be color-matched.

In S155, the development parameter estimation unit 204 estimates the development parameter by using the learning model generated in S153 such that the image characteristics of the developed image are close to those of the target image. The development parameter is estimated for each of the development items by using the learning model generated for the development item. The estimated development parameters are set in the development parameter setting sections 1007 to 1015 and are applied when the development process is performed.

In S156, the development parameter estimation unit 204 saves the development parameters estimated in S155 and ends the process.

As described above, according to the present embodiment, the combination of a development parameter and a developed image is learned, and the learning result is used to estimate the development parameter for developing an image close to a desired image. As a result, the colors produced by the camera that captured the desired image and the colors produced by another camera can be efficiently and automatically matched.

Second Embodiment

According to the first embodiment, the method has been described for generating a learning model for each development parameter of a development item and applying the learning model to estimation of the development parameter.

According to the method of the first embodiment, there is a possibility that the optimum solution is not obtained when a plurality of individual optimal development parameters are combined. For this reason, according to the second embodiment, a method for generating a learning model using a plurality of development parameters is described.

More specifically, according to the first embodiment, in setting of the development parameters, the items for adjusting brightness reproduction are "gamma curve" for adjusting the overall gradation, "black level" and "black gamma" for adjusting the gradation of a dark part, and "knee point" and "slope" for adjusting the gradation of a highlight part. These items determine the gradation of the brightness of an image and interact with one another. Accordingly, according to the second embodiment, these items are not optimized individually. The gradation is roughly adjusted first by using the item "gamma curve" and, thereafter, a process for finely determining the gradation of a dark part and the gradation of a highlight part are performed.

Therefore, in the 16-layer network used in the first embodiment, the layers up to the 13th layer are trained using the "gamma curve" data set, and the remaining 3 layers are trained using a data set corresponding to local development items for a dark part and a highlight part.

Note that since the hardware configuration of an image processing apparatus 1 according to the present embodiment is the same as that of the first embodiment, description of the hardware configuration is not repeated. According to the second embodiment, the processing performed by the development parameter estimation unit 204 is described as a new step S25 instead of S15 described in the first embodiment. Furthermore, configurations the same as those of the first embodiment are identified with the same reference numerals, and description of the configurations is given.

Operation Performed by Development Parameter Estimation Unit

Figure 10:
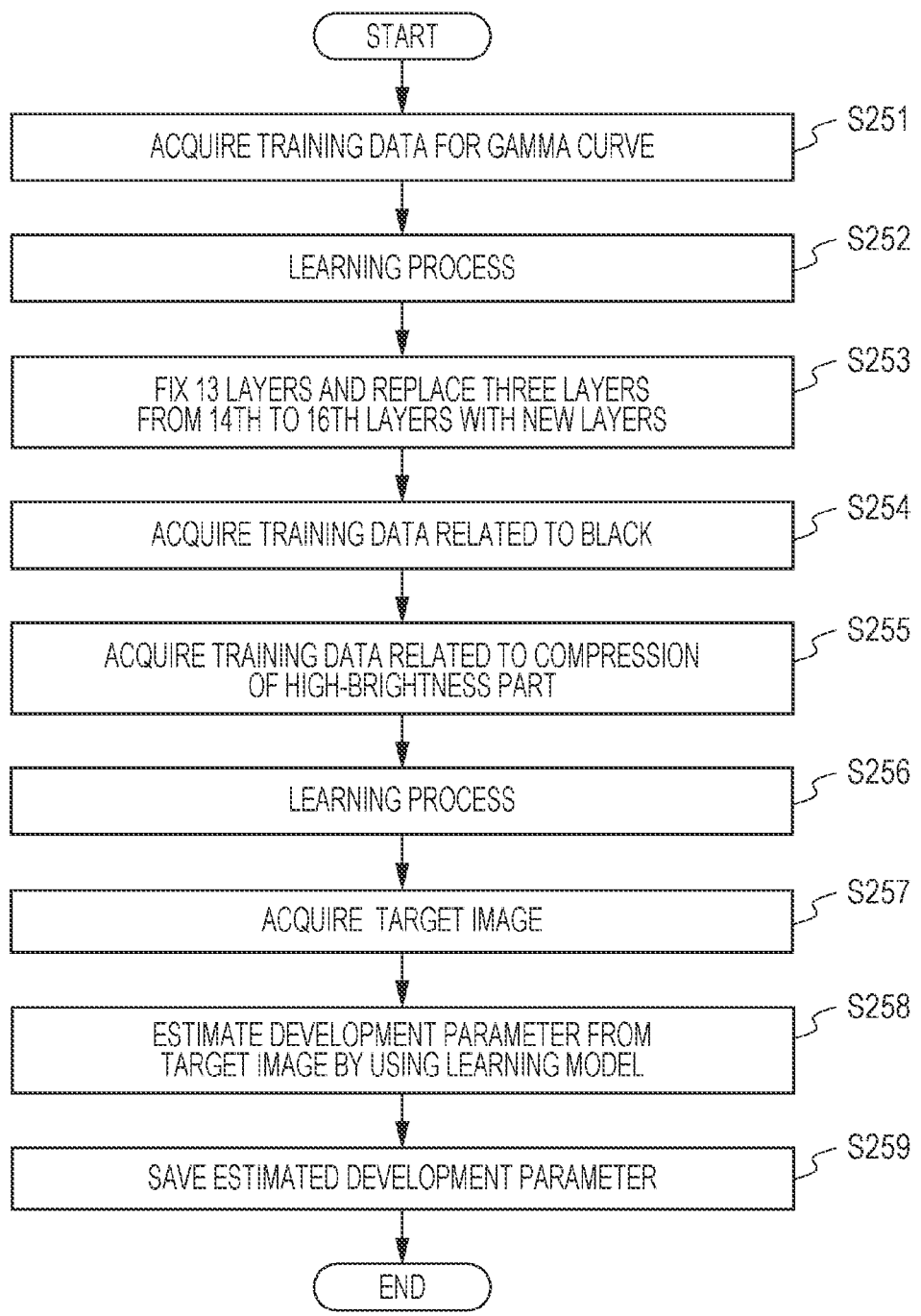
FIG. 10 is a flowchart of the processing performed by a training data generation unit.

FIG. 10 is a flowchart of the processing performed by the development parameter estimation unit 204 in S25.

In S251, the development parameter estimation unit 204 acquires the training data corresponding to the item "gamma curve" from the training data set generated in S14 to generate a learning model.

In S252, the development parameter estimation unit 204 performs a learning process. The CNN is used, and the network configuration uses VGG16 consisting of 16 layers. The details of the process are the same as those described in the first embodiment.

In S253, the development parameter estimation unit 204 fixes the 1st layer to the 13th layer of the network with the parameters learned in S252, and the three layers from the 14th layer to the 16th layer are replaced with new layers in which the parameters have not been optimized yet.

In S254, the development parameter estimation unit 204 acquires, from the training data set generated in S14 for generating the learning model, the training data corresponding to the items "black level" and "black gamma" related to the black gradation reproduction.

In S255, the development parameter estimation unit 204 acquires, from the training data set generated in S14 for generating the learning model, the training data corresponding to the items "knee point" and "slope" related to compression of the high-brightness part.

In S256, the development parameter estimation unit 204 trains the three layers from the 14th to 16th layers by using the training data acquired in S254 and S255.

In S257, the development parameter estimation unit 204 acquires a target image to be color-matched.

In S258, the development parameter estimation unit 204 estimates the development parameters from the target image by using the learning model generated in S252 and S256. Note that according to the present embodiment, the layers up to the 13th layer are fixed, and 14th to 16th layers are replaced with new layers for learning in order to determine more detailed gradation reproduction. However, the layer configuration is not limited thereto. For example, the learning process may be performed by replacing the 12th to 16th layers. Furthermore, the data set used for training is not limited thereto, and when, for example, the item "color matrix" contributes to the gradation of brightness, this may be replaced with a new layer, and the learning process may be performed.

In S259, the development parameter estimation unit 204 saves the development parameters estimated in S258 and ends the process.

As described above, according to the second embodiment, the method has been described for generating a learning model for development parameters that interact with one another using a plurality of development parameters and estimating the development parameters. By using a plurality of development parameters, an image much closer to the developed image can be estimated and, thus, colors can be efficiently matched between cameras.

Third Embodiment

According to the third embodiment, as a method for more efficiently matching the color reproduction characteristics with those of a target image, a training data set is set in a learning model on the basis of the difference value between the target image and the developed image and, thus, more optimal development parameters are derived. The method is described below. Note that since the hardware configuration of an image processing apparatus 1 according to the present embodiment is the same as that of the first embodiment, description of the hardware configuration is not repeated. In the description of the process performed by the development parameter estimation unit 204 below, S15 in the first embodiment is replaced with a new step S35 in the third embodiment. Furthermore, configurations the same as those of the first embodiment are identified with the same reference numerals, and description of the configurations is given.

Operation Performed by Development Parameter Estimation Unit

Figure 11:
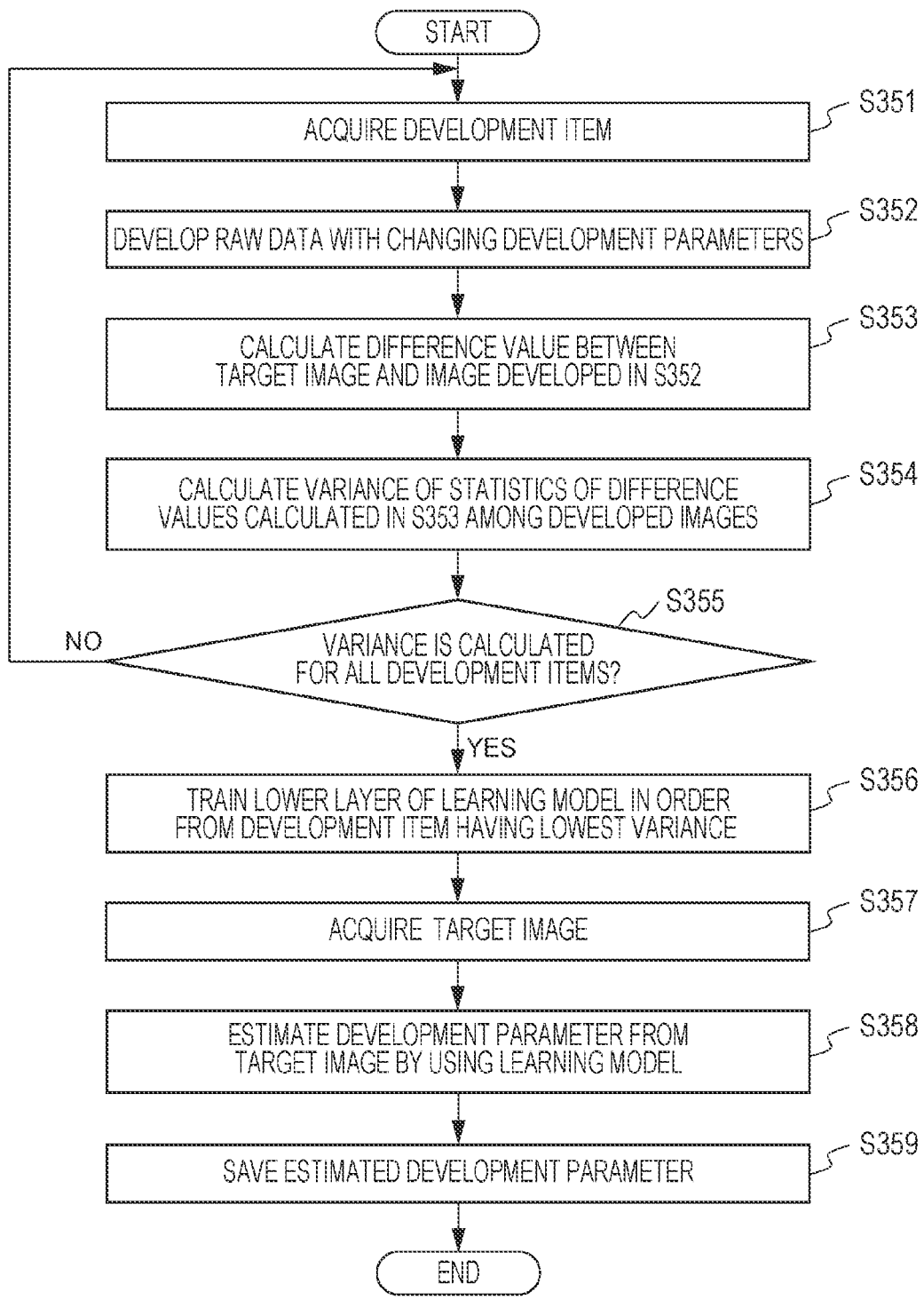
FIG. 11 is a flowchart of the processing performed by the training data generation unit.

FIG. 11 is a flowchart of the processing performed by a development parameter estimation unit 204 in S35.

In S351, the development parameter estimation unit 204 acquires the development item acquired in S13.

In S352, the development parameter estimation unit 204 acquires undeveloped RAW data corresponding to the target image acquired in S12 and performs a development process while changing a development parameter a plurality of times for each of the development items.

In S353, the development parameter estimation unit 204 calculates the difference value between the pixel values of the target image and each of the plurality of developed images developed in S352. According to the present embodiment, to obtain the difference value between the pixel values, the difference value for each of R, G, and B pixels is calculated, and the calculated values are averaged at each of coordinate positions. However, another statistical value, such as the median value or the mode value, may be used. Alternatively, instead of the difference value between pixel values, the brightness value may be calculated from the pixel value by using a predetermined conversion equation for sRGB or Adobe RGB, and the color value is further calculated by using a CIE-Lab conversion equation or the like. Thereafter, a brightness difference, which is the difference between the brightness values, and a color difference, which is the difference between the color values, may be used.

In S354, the development parameter estimation unit 204 calculates the variance value among images for which the development parameters are changed a plurality of times in S352 on the basis of the statistical value that represents the difference from the target image and that is calculated in S353. Note that according to the present embodiment, the variance value is used, but another statistical value, such as the standard deviation, may be used. It is deemed that the larger the variance, the higher the contribution ratio of the development parameter of the development item to the target image (the smaller the variance, the lower the contribution ratio). Thus, the learning process is performed such that the weight is increased for the development item having a high contribution ratio in classification by the learning model.

In S355, the development parameter estimation unit 204 determines whether the variance among the developed images has been calculated for all the development items. If the variance has been calculated for all the development items, the processing proceeds to S356. However, if the variance has not been calculated, the processing returns to S351.

In S356, the development parameter estimation unit 204 performs a learning process. The CNN is used, and the network configuration uses VGG16 consisting of 16 layers. The details of the process are the same as those described in the first embodiment. To set the data set used for training, items having development parameters with a small contribution are set in the lower layers of the learning model, and items having development parameters with a large contribution are set in the upper layers to increase the weight of learning. Thereafter, a learning process is performed.

In S357, the development parameter estimation unit 204 acquires a target image to be color-matched.

In S358, the development parameter estimation unit 204 estimates the development parameters from the target image by using the learning model generated in S356.

In S359, the development parameter estimation unit 204 saves the development parameters estimated in S358 and ends the process.

As described above, according to the third embodiment, a learning model is generated such that the weight of the network increases in ascending order of the contribution ratio of the development item of the image to be corrected to the target image, and the development parameters are estimated. By increasing the optimization weight for items that have a large impact on color reproduction among the developed items, the colors can be efficiently matched between the cameras.

Other Embodiments

Figure 12:
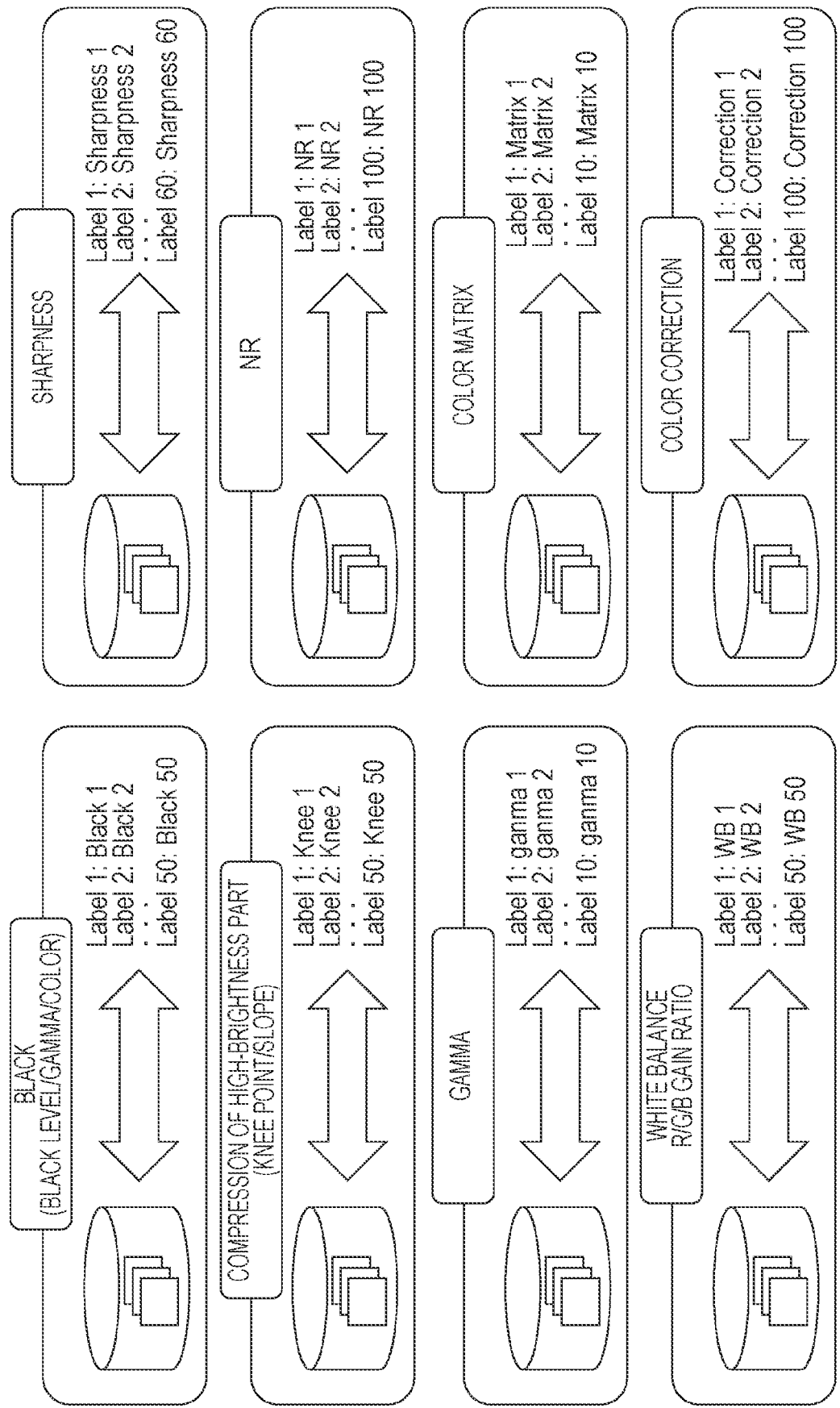
FIG. 12 illustrates an example of a training data set.

According to the first and second embodiments, to efficiently match colors between cameras, a method for estimating development parameters related to color reproduction has been described. In addition to color reproduction, the camera characteristics include sharpness and noise. To match these characteristics, for example, as illustrated in FIG. 12, training data sets related to development items "sharpness" and "NR" may be generated. Thereafter, the development parameters may be estimated. For the item "sharpness", the correspondence relationship between each of the images developed while changing the intensity of sharpness and the set value of the sharpness is retained in the data set. For the item "NR", the correspondence relationship between each of the images developed while changing the level of NR and the development parameter for the NR is retained in the data set. By performing the above-mentioned learning process using these data sets, development parameters related to sharpness and noise can be estimated without limiting to color reproduction.

Alternatively, the present embodiment can be implemented by processing in which a program that provides at least one function of the above-described embodiment is supplied to a system or an apparatus via a network or storage medium, and one or more processors in a computer of the system or apparatus read the program and execute the program. Still alternatively, the present embodiment can be implemented by a circuit (for example, ASIC) that provides at least one function of the above-described embodiment.

According to an aspect of the embodiments, colors can be matched between captured images by estimating the development parameters for developing an image close to a desired image from the result of a learning process that has learned combinations of a development parameter and a developed image.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-186562 filed Nov. 9, 2020, which is hereby incorporated by reference herein in its entirety.

What is claimed is:

1. An apparatus comprising:
one or more processors; and
at least one memory coupled to the one or more processors storing instructions that,
when executed by the one or more processors, cause the one or more processors to function as:
a first acquisition unit configured to acquire RAW image data captured by a first device and captured image data captured by a second device;
an estimation unit configured to estimate a parameter of the first device by using a learning model that has learned a correspondence relationship between a parameter used to develop RAW image data and an image developed using the parameter such that characteristics of a developed image of the RAW image data are close to characteristics of the captured image; and
a development unit configured to develop the RAW image data by using the parameter of the first device,
wherein the learning model is a model generated for each of items of parameters used by the estimation unit.

2. The apparatus according to claim 1,
wherein the captured image data is image data obtained by capturing a target image.

3. The apparatus according to claim 2, wherein the item is an item related to color reproduction characteristics of an image.

4. The apparatus according to claim 2, wherein the one or more processors further function as:
a second acquisition unit configured to acquire the item; and
a generation unit configured to develop the RAW image data acquired by the first acquisition unit by using a plurality of the parameters for the item acquired by the second acquisition unit and generate the correspondence relationship.

5. The apparatus according to claim 2, wherein the learning model sets the item related to overall brightness reproduction of an image in a lower layer of the learning model and performs a learning process and sets the item related to local brightness reproduction of an image in a higher layer and performs a learning process.

6. The apparatus according to claim 2, wherein the learning model is generated by a learning process in which a contribution ratio of each of the items in color reproduction of the target image is calculated, and training data are set so that a weight of a network in a higher layer of the learning model increases in ascending order of the contribution ratio of an item.

7. A non-transitory computer-readable storage medium storing instructions that, when executed by a computer, cause the computer to perform a method comprising:
acquiring RAW image data captured by a first device and captured image data captured by a second device;
estimating obtaining a parameter of the first device by using a learning model that has learned a correspondence relationship between a parameter used to develop RAW image data and an image developed using the parameter such that characteristics of a developed image of the RAW image data are close to characteristics of the captured image; and
developing the RAW image data by using the parameter of the first device,
wherein the learning model is a model generated for each of items of parameters used by the estimating.

8. The non-transitory computer-readable storage medium according to claim 7, wherein the captured image data is image data obtained by capturing a target image.

9. The non-transitory computer-readable storage medium according to claim 8, wherein the item is an item related to color reproduction characteristics of an image.

10. The non-transitory computer-readable storage medium according to claim 8, further comprising:
acquiring the item; and
developing the acquired RAW image data by using a plurality of the parameters for the acquired item and generating the correspondence relationship.

11. The non-transitory computer-readable storage medium according to claim 8, wherein the learning model sets the item related to overall brightness reproduction of an image in a lower layer of the learning model and performs a learning process and sets the item related to local brightness reproduction of an image in a higher layer and performs a learning process.

12. The non-transitory computer-readable storage medium according to claim 8, wherein the learning model is generated by a learning process in which a contribution ratio of each of the items in color reproduction of the target image is calculated, and training data are set so that a weight of a network in a higher layer of the learning model increases in ascending order of the contribution ratio of an item.

13. A method comprising:
acquiring RAW image data captured by a first device and captured image data captured by a second device;
estimating a parameter of the first device by using a learning model that has learned a correspondence relationship between a parameter used to develop RAW image data and an image developed using the parameter such that characteristics of a developed image of the RAW image data are close to characteristics of the captured image; and
developing the RAW image data by using the parameter of the first device,
wherein the learning model is a model generated for each of items of parameters used by the estimating.

14. The method according to claim 13, wherein the captured image data is image data obtained by capturing a target image.

15. The method according to claim 14, wherein the item is an item related to color reproduction characteristics of an image.

16. The method according to claim 14, further comprising:
acquiring the item; and
developing the acquired RAW image data by using a plurality of the parameters for the acquired item and generating the correspondence relationship.

17. The method according to claim 14, wherein the learning model sets the item related to overall brightness reproduction of an image in a lower layer of the learning model and performs a learning process and sets the item related to local brightness reproduction of an image in a higher layer and performs a learning process.

18. The method according to claim 14, wherein the learning model is generated by a learning process in which a contribution ratio of each of the items in color reproduction of the target image is calculated, and training data are set so that a weight of a network in a higher layer of the learning model increases in ascending order of the contribution ratio of an item.

* * * * *